F. W. CARLSON.

CLOSET BEND OR CONNECTION.

APPLICATION FILED JUNE 29, 1912.

Reissued Nov. 5, 1912.

13,485.

2 SHEETS—SHEET 1.

Witnesses:
Geo. E. Davison
Ira J. Wilson

Inventor
Frank W. Carlson
By Lindenmann, Belt & Fuller
Attys.

F. W. CARLSON.

CLOSET BEND OR CONNECTION.

APPLICATION FILED JUNE 29, 1912.

Reissued Nov. 5, 1912. 13,485.

2 SHEETS—SHEET 2.

Witnesses:

Ed. C. Davison

Ira J. Hilton

Inventor:

Frank H. Carlson

By Lusthieum Belt & Fullis

Attys.

UNITED STATES PATENT OFFICE.

FRANK W. CARLSON, OF CHICAGO, ILLINOIS.

CLOSET BEND OR CONNECTION.

13,485. Specification of Reissued Letters Patent. Reissued Nov. 5, 1912.

Original No. 986,905, dated March 14, 1911, Serial No. 507,884. Application for reissue filed June 29, 1912. Serial No. 706,821.

*To all whom it may concern:*

Be it known that I, FRANK W. CARLSON, a citizen of the United States, residing at Chicago, in the county of Cook and State of Illinois, have invented certain new and useful Improvements in Closet Bends or Connections, of which the following is a specification.

Heretofore pipe bends or connections have been made open at both ends and after being attached to the drainage system of a building they are plugged at the end which is to be connected to the closet bowl so that the system can be tested before the building is plastered and to prevent rubbish from falling into the connection. It happens sometimes that one or more of these plugs will be blown out or removed and this will let the water drain off and spoil the test. While the work is going on in the building it also happens with more or less frequency that the plugs are knocked out or deliberately removed and rubbish falls or is thrown into the bend or connection which eventually causes a great deal of trouble in the drainage system.

One of the objects of this invention is to provide a stock closet bend or connection of simple and inexpensive construction which can be easily and quickly made to fit in place beneath any floor.

Another object of the invention is to provide means to facilitate setting or fitting the closet bowl in place and securely locking it to the closet bend or connection.

Figure 1:
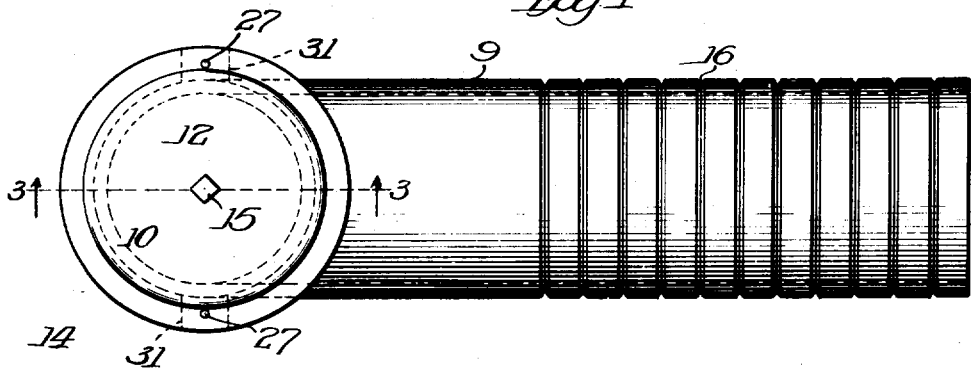
Figure 2:
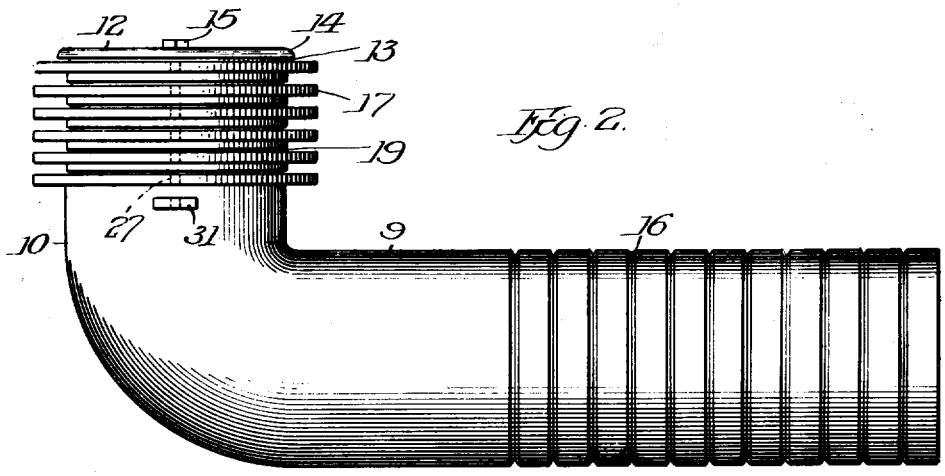
Figure 3:
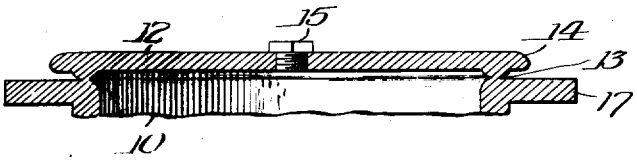
Figure 4:
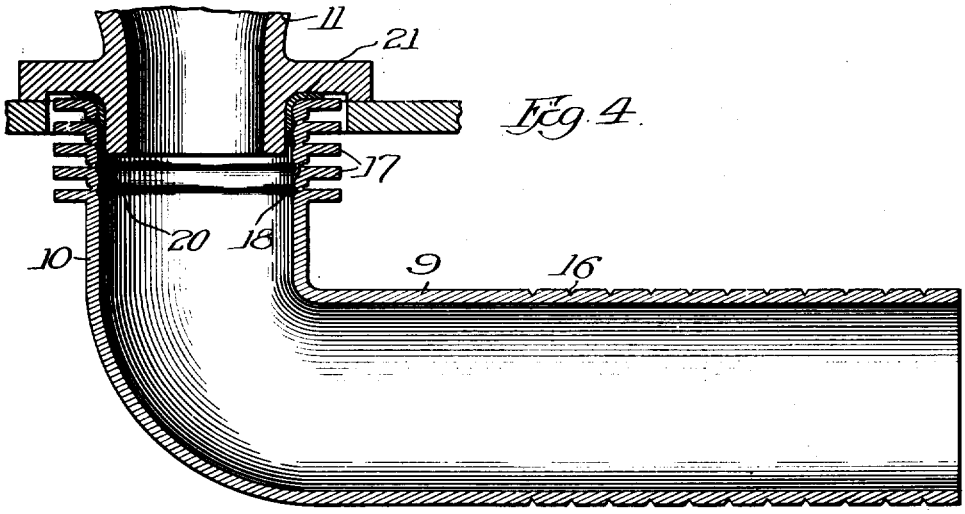
Figure 6:
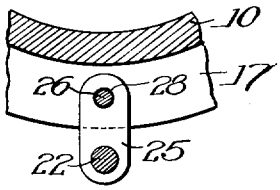
Figure 5:
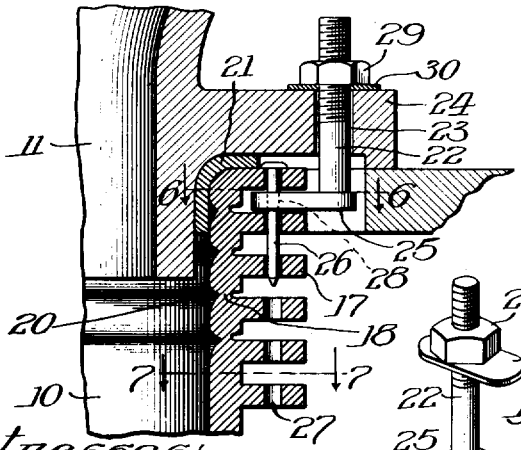
Figure 7:
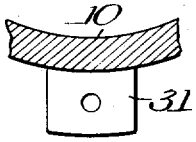
Figure 8:
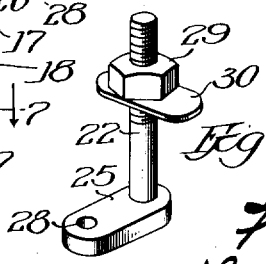

In the accompanying drawings illustrating the preferred embodiment of my invention—Figure 1 is a top plan view of the closet bend or connection; Fig. 2 is a side elevation thereof; Fig. 3 is a detail enlarged sectional view on the line 3—3 of Fig. 1, showing the cap; Fig. 4 is a vertical central sectional view; Fig. 5 is a detail enlarged sectional view showing the means for locking the closet bowl and bend or connection together; Figs. 6 and 7 are sectional views on the lines 6—6 and 7—7 of Fig. 5; and Fig. 8 is a detail view.

Referring to the drawings, the bend or connection is cast in one piece and comprises a horizontal member 9 which is connected to the drainage system and an upright member 10 which is connected to the closet bowl 11 (Fig. 4). The upright member has an integral cap 12 which is connected with the upright member by a contracted neck 13 and projects beyond said neck to provide, in effect, a peripheral flange 14 (Fig. 3). A screw plug 15 is arranged in the cap for a purpose hereafter described. The horizontal member has a plurality of grooves 16 spaced apart at suitable intervals beginning at its end which will facilitate cutting down the bend or connection to fit the system. The horizontal member can be cut at any one of the grooves very easily by using a chisel and hammer. The upright member has a plurality of peripheral flanges 17 spaced apart at suitable intervals. The upright member is contracted just above each flange 17 to form a neck 18 (Fig. 5) to facilitate cutting down the upright member to the proper height for connection with the closet bowl. To form the necks I prefer to provide the upright member with a peripheral groove 19 on its exterior and just above each flange and to recess or round off the interior of the upright member at 20 opposite each groove. By inserting a chisel in any of these grooves 19 and applying a hammer the upright member can be cut evenly on the line of the groove to reduce the upright member to the proper hight for any particular installation. The gasket 21 is arranged between the upright member and the closet bowl and the rounded surface at 20 on the interior of the upright member provides a proper seat for the gasket.

The closet bowl is connected and locked to the bend or connection by a bolt 22 which passes through a slot 23 in the flange 24 on the bowl. The bolt has an enlarged or offset head 25 (Fig. 8) which is adapted to fit between two of the flanges on the upright member 10 (Fig. 5) and it is secured in position between these flanges by a pin 26 which seats in alined openings 27 in the flanges and an opening 28 in the bolt head 25. Two bolts are usually employed and in assembling the parts, after the upright member has been cut down to fit the floor and made ready to have the closet bowl fitted or set in place, the bolts are first fastened to the bend or connection, as shown, and then the bowl is set. After these parts have been properly positioned the nut 29 on each of the bolts is tightened to lock the parts together.

While it is preferable to arrange the bolt head between the top and the next adjacent flange, as shown in Fig. 5, this is not essential because it will be readily seen that the bolt head could be put between the second and third or any of the other flanges if it is long enough to project up through the flange of the closet bowl to receive the nut. A washer 30 is arranged between the flange 24 of the closet bowl and the nut. This construction permits the bowl to swing in a considerable arc without engaging the flanges on the upright member of the bend or connection and this is important because it frequently happens that the slot in the flange of the closet bowl is irregularly formed or inaccurately positioned. This freedom of adjustment of the bowl greatly facilitates the connection of the closet bowl and the bend or connection. Beneath the lowest flange I provide two lugs 31 on the upright member of the bend or connection to be used when said member is cut down to the bottom flange and these lugs are bored to receive the pins 26 as before described.

I contemplate making the bend or connection as a stock article because it is adapted to be readily cut to fit different installations according to the particular conditions of each. After the bend or connection has been connected with the drainage system in a building and the stack completed the whole system can be filled with water for the water test. The inspector can ascertain at any time whether the bend or connection is filled with water by removing the plug 15.

My invention avoids the necessity for employing plugs to close the end of the upright member which heretofore has been left open and also avoids the liability of these plugs being blown out or becoming disarranged while the test is being conducted. It has been customary to leave the stack filled with water over night in performing the test and it happens with more or less frequency that the plugs are forced out or are deliberately or accidentally knocked out during this period. This necessitates a retest which involves considerable delay and annoyance. After the test is completed and while the building is being finished, plastered and the floors laid, the cap 12 is permitted to remain on the bend or connection. This continues the seal and prevents the bend or connection from being filled and clogged with rubbish which frequently creates a great deal of trouble. After the floor of the building has been laid and it is time to set the closet bowl in place the cap 12 is removed by the use of a chisel and hammer and the upright member is cut down to a proper height in the same manner. Then the closet bowl is secured in place.

My invention provides a bend or connection of simple and inexpensive construction which greatly reduces the cost and facilitates the installation of the plumbing system in a building. It provides a permanent seal for the bend or connection until it is time to set the closet bowl and thus enables the test to be conducted to better advantage and avoids the liability of the drainage system being clogged with rubbish entering through the bend or connection.

The integral cap on my improved bend or connection prevents the escape of sewer gas after the bend or connection is installed in the drainage system and while the building is in course of erection and completion.

What I claim and desire to secure by Letters Patent is:

1. A closet bend or connection having at one end and on the exterior thereof a plurality of peripheral grooves, the interior of said bend or connection being recessed and rounded opposite each of said grooves to facilitate cutting the bend or connection along the line of a groove and to form a gasket seat.

2. A closet bend or connection having at one end a plurality of peripheral flanges spaced apart and a bolt having a head adapted to be engaged between any pair of the flanges.

3. A closet bend or connection having at one end a plurality of peripheral flanges spaced apart, a contracted neck adjacent to each flange, and a bolt having a head adapted to be engaged between any pair of the flanges.

4. A closet bend or connection having at one end a plurality of peripheral flanges provided with alined openings, a bolt having an offset head adapted to be engaged between any pair of flanges and provided with an opening to aline with the openings in said flanges, and a pin to fit in said openings and pivotally connect the bolt with the bend or connection.

5. The combination of a closet bowl having a flange and a slot in said flange, of a bend or connection having at one end a plurality of peripheral flanges provided with alined openings, a bolt having an offset head to fit between any pair of flanges and to project up through the slot in the closet bowl flange, a pin engaging the flanges and the head of the bolt to pivotally connect the bolt to the bend or connection, and means for securing the bolt to the flange on the closet bowl.

6. A closet bend or connection having at one end a plurality of peripheral flanges spaced apart and extending outside the perimeter of the bend in substantially parallel relation and each having a flat upper face of substantial width adapted to coöperate with an opposed face of a closet bowl to form a tight connection, the material of the bend between said flanges being weakened to facilitate reduction of the bend to the required length whereby one of said flanges will be disposed at the requisite height to establish a connection with a closet bowl.

7. A closet bend or connection having at one end a plurality of peripheral flanges of substantial width spaced apart and extending outside the perimeter of the bend, the material of the bend being weakened between the flanges to facilitate reducing the length of the bend whereby to provide a flange at the end of the bend disposed at the requisite height relatively to a floor and having its outer face adapted to form a connection with an opposed face of a closet bowl.

8. A closet-bend or connection having at one end a plurality of peripheral flanges extending outside the perimeter of the bend in substantial parallel relation and spaced apart to permit of the bend being cut off between adjacent flanges to reduce the length of the bend, each flange having a flat upper face of substantial width adapted to coöperate with an opposed face of a closet-bowl to form a tight connection.

9. A closet-bend or connection having at one end a plurality of peripheral flanges extending outside the perimeter of the bend in substantial parallel relation and spaced apart to permit of the bend being cut off between adjacent flanges to reduce the length of the bend, each flange having a flat upper face of substantial width adapted to coöperate with an opposed face of a closet-bowl to form a tight connection, and means carried by the bend for connecting the bend to a closet-bowl at any of the flanges.

FRANK W. CARLSON.

Witnesses:
IRA J. WILSON,
LUTHER JOHNS.